(12) United States Patent
Coatantiec et al.

(10) Patent No.: US 9,726,499 B2
(45) Date of Patent: Aug. 8, 2017

(54) METHOD OF DETERMINING A RADIUS OF PROTECTION ASSOCIATED WITH A NAVIGATION PARAMETER OF A HYBRID INERTIAL NAVIGATION SYSTEM, AND ASSOCIATED SYSTEM

(71) Applicant: Thales, Courbevoie (FR)

(72) Inventors: Jacques Coatantiec, Montelier (FR); Nicolas Vercier, Valence (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/933,999

(22) Filed: Nov. 5, 2015

(65) Prior Publication Data

US 2016/0131485 A1 May 12, 2016

(30) Foreign Application Priority Data

Nov. 7, 2014 (FR) .................................... 14 02530

(51) Int. Cl.
| | | |
|---|---|---|
| *G01C 21/16* | (2006.01) | |
| *G01C 21/20* | (2006.01) | |
| *G01S 19/40* | (2010.01) | |
| *G01S 19/49* | (2010.01) | |

(52) U.S. Cl.
CPC ........... *G01C 21/165* (2013.01); *G01C 21/20* (2013.01); *G01S 19/40* (2013.01); *G01S 19/49* (2013.01)

(58) Field of Classification Search
CPC .............................. G01C 21/165; G01C 21/20
See application file for complete search history.

(56) References Cited

U.S. PATENT DOCUMENTS

| 7,940,210 B2 * | 5/2011 | Fly .......................... | G01S 19/20 340/539.13 |
| 2004/0239560 A1* | 12/2004 | Coatantiec .............. | G01S 19/47 342/357.62 |
| 2004/0267444 A1* | 12/2004 | Coatantiec .............. | G01C 5/005 701/533 |
| 2007/0156338 A1* | 7/2007 | Coatantiec .............. | G01S 19/23 701/472 |
| 2008/0228421 A1* | 9/2008 | Guichard ............... | G01D 3/022 702/89 |
| 2010/0026567 A1* | 2/2010 | Coatantiec ........... | G01C 21/165 342/357.62 |

(Continued)

FOREIGN PATENT DOCUMENTS

| EP | 2299287 A1 | 3/2011 |
| EP | 2706379 A1 | 3/2014 |

(Continued)

OTHER PUBLICATIONS

French Search Report and Written Opinion dated Aug. 5, 2015, in French Patent Application No. 14/02530, filed Nov. 7, 2014, 9 pages.

*Primary Examiner* — Truc M Do
*Assistant Examiner* — Jess Whittington
(74) *Attorney, Agent, or Firm* — Davis Wright Tremaine LLP; Michael J. Donohue (57) ABSTRACT

Method of determining at least one radius of protection associated with a respective navigation parameter of a hybrid inertial navigation system by Kalman filtering employing introduction of a position bias into the state model of the Kalman filter representing the uncertainty associated with the reference safe position.

9 Claims, 5 Drawing Sheets

(56) References Cited

U.S. PATENT DOCUMENTS

| | | | |
|---|---|---|---|
| 2010/0324822 A1* | 12/2010 | Coatantiec | G01S 19/47 701/472 |
| 2011/0084874 A1* | 4/2011 | Coatantiec | G01S 19/20 342/357.3 |
| 2013/0030775 A1* | 1/2013 | Clemenceau | G01S 19/48 703/2 |
| 2013/0120183 A1* | 5/2013 | Revol | G01S 5/021 342/37 |
| 2014/0074397 A1* | 3/2014 | Vanderwerf | G01S 19/20 701/472 |
| 2014/0229100 A1* | 8/2014 | Marcon | G01C 21/165 701/469 |
| 2014/0292574 A1 | 10/2014 | Dunik | |

FOREIGN PATENT DOCUMENTS

| | | |
|---|---|---|
| WO | 03029755 A1 | 4/2003 |
| WO | 2008040658 A1 | 4/2008 |
| WO | 2014170478 A1 | 10/2014 |

\* cited by examiner

METHOD OF DETERMINING A RADIUS OF PROTECTION ASSOCIATED WITH A NAVIGATION PARAMETER OF A HYBRID INERTIAL NAVIGATION SYSTEM, AND ASSOCIATED SYSTEM

BACKGROUND OF THE INVENTION

Field of the Invention

The present invention relates to a method of determining a radius of protection associated with a respective navigation parameter of a hybrid inertial navigation system, and associated system.

Description of the Related Art

The present invention may be used in the aeronautical field, as in the remainder of the description, but may also be used in any other navigation field.

There is a problem in supplying safe navigation parameters (such as speed and attitude) to the pilot, i.e., in knowing the navigation parameter or parameters and obtaining a respective radius of protection associated with that parameter. A radius of protection gives an uncertainty associated with the navigation parameter: in other words, the pilot knows within a given probability that the error in respect of the navigation parameter cannot be greater than the radius of protection.

There is known the document US2014074397, which discloses a method of providing the integrity of a hybrid navigation system using a Kalman filter. The method consists in determining a main navigation solution for at least one of the roll, pitch, platform heading or vehicle heading parameters using signals from a plurality of GNSS (Global Navigation Satellite System) satellites and inertial measurements. Solution separation is used to determine a plurality of subsolutions for the main navigation solution. This method also includes the determination of a separation between the main navigation solution and each of the subsolutions and a discriminator for each of the separations. The method also includes the determination of a separation variance between the main navigation solution and each of the subsolutions, a satellite failure detection threshold based on the separation of the variances, and a limit of protection that delimits an error in the main navigation solution as a function of the threshold.

Figure 1:
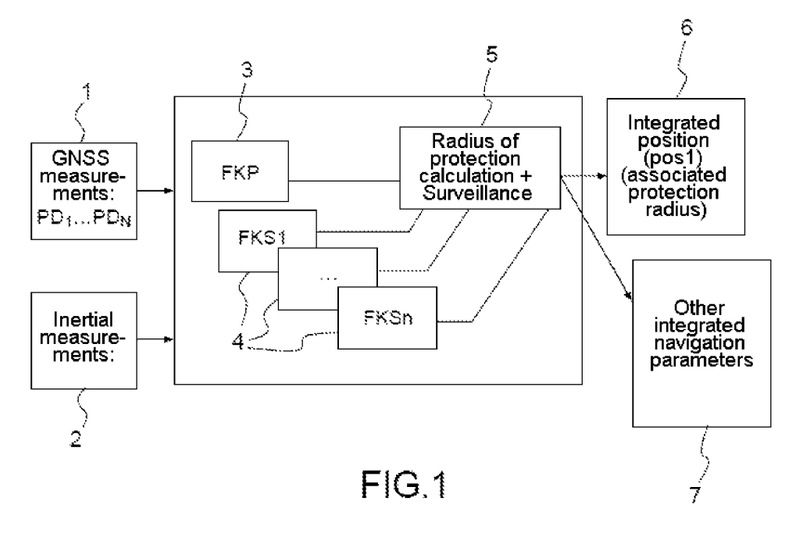
FIG. 1 shows diagrammatically a prior art method.

Such a method is shown in FIG. 1, in which the method receives as input measurements 1 of pseudo-distances $PD_1$, $PD_2$, . . . $PD_N$ supplied by a GNSS (Global Navigation Satellite System) and from the hybrid inertial navigation system inertial measurements 2 including position, speed, attitude and altitude. The method includes a main Kalman filter step FKP 3 and a plurality of secondary filter steps FKSi 4 (with i varying from 1 to n), and a step 5 of radius of protection computation and monitoring. The method supplies as output a safe position and an associated radius of protection 6 together with other safe navigation parameters 7.

Providing a safe speed or safe attitudes necessitates a model of the short-term variation of the input pseudo-distance measurements and an undetected satellite failure rate associated with these short-term variations has the following disadvantages.

The undetected satellite failure rate of $10^{-4}$/h is supplied in relation to amplitude errors and not short-term variations that can affect the speed or the attitudes.

In the standards there is no valid model of short-term variations of the pseudo-distances.

Such methods are subject to unmodelled short-term variations of GNSS errors, for example GPS errors (the latter are of course smoothed by the inertia but it is not possible to say in what proportion). The radius of protection associated with the speed covers only certain types of faults and not faults linked to short-term variations.

An object of the present invention is to alleviate these drawbacks, notably by making no hypothesis as to the short-term variations of the GPS measurements.

One aspect of the invention proposes a method of determining at least one radius of protection associated with a respective navigation parameter of a hybrid inertial navigation system by Kalman filtering including the steps of:

receiving at the filter input a safe position measurement and an inertial measurement from the hybrid inertial navigation system comprising a triaxial accelerometer measurement and a triaxial rate gyro measurement;

producing an inertial platform from the inertial measurements to obtain at least one navigation parameter from a set of parameters including the position, speed, attitude and altitude from the hybrid inertial navigation system;

effecting Kalman filtering including updating of a state vector including an estimate of the errors of the navigation parameter or parameters and a covariance matrix associated with those states, propagation of the state vector, hybridizing the inertial navigation data with the safe position received by means of the following iterative substeps:

effecting a updating of the state vector based on an observation of the difference between the inertial measurement and the safe position measurement, wherein a position bias is introduced into the states model of the Kalman filter, representing the uncertainty associated with the input measured safe position;

decorrelating the state of said position bias of all of the other states by means of the following substeps:

rendering the state of said position bias independent of the other states during two successive propagations by increasing the model noise of the position bias;

cancelling the correlations present in the matrix of the Kalman filter of this state with all the other states; and reinitializing the covariance of the position bias state with the input safesafe position measurement uncertainty;

propagating the state vector until the covariance associated with the position error state estimated by the Kalman filter is equal to the covariance associated with the safe position bias;

computing the safe navigation parameter or parameters by adding to the inertial navigation parameters from the inertial platform the estimated navigation errors contained in the state vector of the Kalman filter; and computing the radius or radii of protection associated with respective safe navigation parameter or parameters using the covariance matrix of the Kalman filter.

Such a method makes it possible to supply safe navigation parameters, i.e. parameters supplied with the associated radius of protection, without making hypotheses as to the measurements used apart from the maximum amplitude of the error that affects them.

In accordance with one embodiment, the step consisting in receiving at the input of the filter a safe position measurement uses a system combining inertia and a satellite navigation system.

In one embodiment, the step consisting in receiving at the input of the filter a safe position measurement uses a spatial augmentation system.

Another aspect of the invention proposes a system for determining at least one radius of protection associated with a respective navigation parameter of a hybrid inertial navigation system, including a Kalman filter adapted to execute the method as described above.

A further aspect of the invention proposes an aircraft including a system as described above.

BRIEF DESCRIPTION OF THE SEVERAL VIEWS OF THE DRAWINGS

The invention will be better understood after studying a few embodiments described by way of non-limiting example and illustrated by the appended drawings, in which.

In all the figures, elements having identical references are similar.

DETAILED DESCRIPTION OF THE INVENTION

Figure 2:
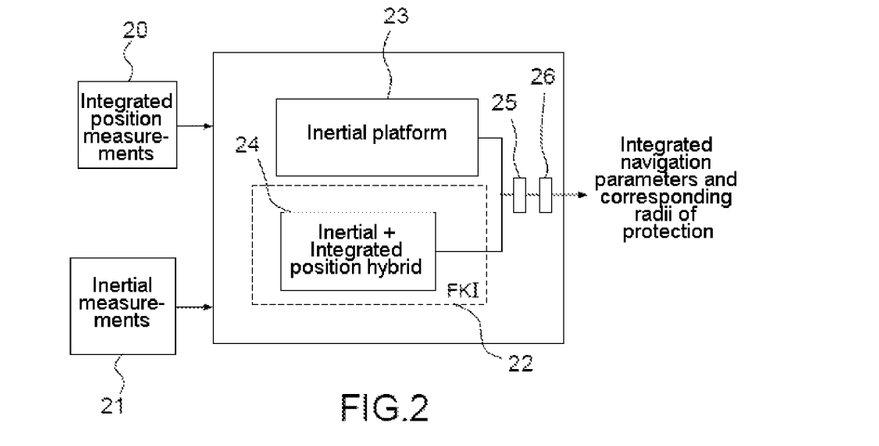
FIGS. 2 and 3 show diagrammatically a method in accordance with one aspect of the invention.

FIG. 2 shows diagrammatically a method in accordance with one aspect of the invention in which the integrity Kalman filter FKI 22 receives as input safe position measurements 20 and inertial measurements 21. The Kalman filter FKI 22 uses an inertial platform 23 and an inertial and safe position hybrid 24 to deliver as output safe navigation parameters and the corresponding radii of protection.

Figure 3:
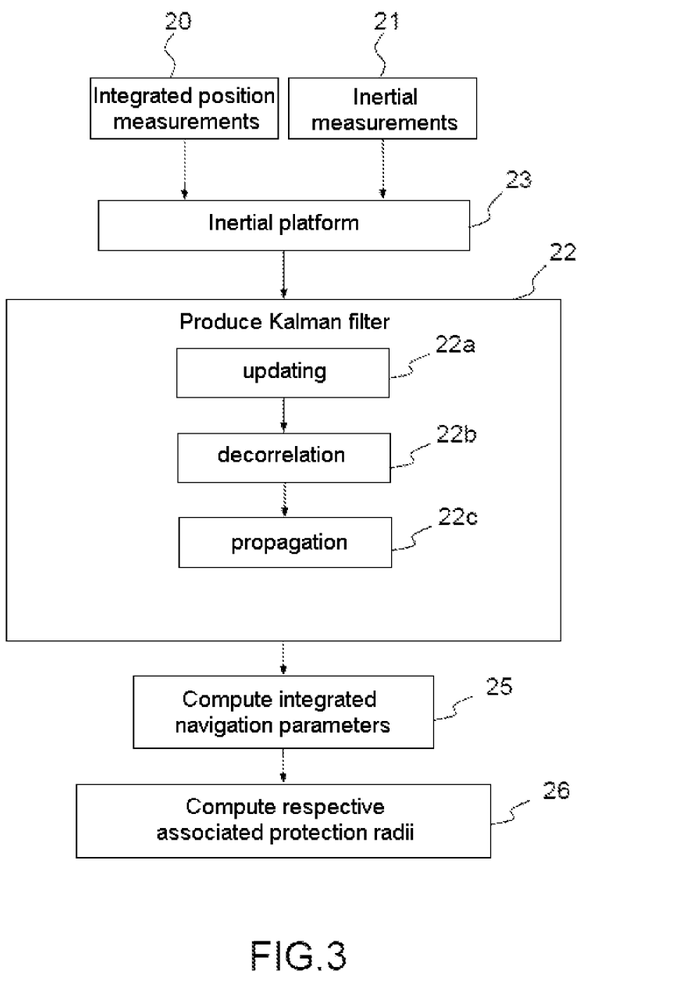

FIG. 3 shows the FIG. 2 method in more detail.

The method of determining at least one radius of protection associated with a respective navigation parameter of a hybrid inertial navigation system by Kalman filtering includes steps consisting in:

receiving at the filter input a safe position measurement 20 and an inertial measurement 21 from the hybrid inertial navigation system comprising a triaxial accelerometer measurement and a triaxial rate gyro measurement;

producing an inertial platform 23 from the inertial measurements to obtain at least one navigation parameter from a set of parameters including the position, speed, attitude and altitude from the hybrid inertial navigation system;

effecting Kalman filtering 22 including updating of a state vector including an estimate of the errors of the navigation parameter or parameters and a covariance matrix associated with those states, propagation of the state vector, hybridizing the inertial navigation data with the safe position received by means of the following iterative substeps:

effecting a updating 22a of the state vector based on an observation of the difference between the inertial measurement and the safe position measurement, wherein a position bias is introduced into the states model of the Kalman filter, representing the uncertainty associated with the input measured safe position;

decorrelating 22b the state of said position bias of all of the other states by means of the following substeps:

rendering the state of said position bias independent of the other states during two successive propagations by increasing the model noise of the position bias;

cancelling the correlations present in the matrix of the Kalman filter of this state with all the other states; and reinitializing the covariance of the position bias state with the input safe position measurement uncertainty;

propagating 22c the state vector until the covariance associated with the position error state estimated by the Kalman filter is equal to the covariance associated with the safe position bias;

computing 25 the safe navigation parameter or parameters by adding to the inertial navigation parameters from the inertial platform the estimated navigation errors contained in the state vector of the Kalman filter; and computing 26 the radius or radii of protection associated with the respective safe navigation parameter or parameters using the covariance matrix of the Kalman filter.

The step consisting in receiving at the filter input a safe position measurement 20 may use a system combining inertia and a satellite navigation system or a spatial augmentation system.

There follows a detailed, non-limiting embodiment for determining the safe speed parameter.

The safe speed is computed using a velocity integrity Kalman filter (VIKF) or coasting filter (CF) that updates on the position of the location (latitude and longitude). A bias with no model noise is added to the measurement with a fixed propagation and that is decorrelated from the other states between measurements. There are two bias states: one state for the latitude and one state for the longitude. The remainder of the description concentrates on only one bias state, the second one functioning in the same manner. The purpose of the decorrelation is to prevent the filter estimating the bias at the same time as taking this potential error into account in each measurement used.

Decorrelating the bias between two successive measurements is normally representative of reality only if the bias is completely independent between two measurements. There are therefore two possibilities:

either the real bias is completely different between two successive measurements, in which case the model is completely valid, or the real bias is not independent between two measurements at all; it is then possible, for example, to consider that the bias is constant; the description concentrates on this situation, in which a reality departs most from the model used to produce the Kalman filter.

The measurement may be:

either the position of the location (main filter that regularly uses GPS (example of GNSS)) measurements associated with its radius of integrity called the PLFD-SIS (Protection Level Fault Detection Signal In Space);

or a safe position (for example an SBAS (satellite-based augmentation system) position) associated with its HIL radius of integrity.

The covariance of the bias is initialized to the maximum uncertainty value (the value of the integrity radius) along one axis (maximum position error value before detection) multiplied by a factor CoefAdaptation to be defined (this factor may be >1 or <1). The value of this factor may be fixed at $$1/sqrt(2) = \frac{1}{\sqrt{2}}$$

to take into account the fact of working on each axis (longitude, latitude).

Until the position covariance reaches the bias covariance, new measurements are ignored in the filter that manages the integrity (optionally with a minimum time denoted Time-UpdateFC). This is the major aspect of this filter that renders it valid. If the bias does not budge between two measurements, it is the position state that should have budged and the hypothesis of independence on the bias between two successive measurements is still valid from the point of view of the filter. This also assumes that the position covariance does not converge artificially because it will always be greater than the covariance of the bias divided by two.

The greater the minimum time TimeUpdateFC, the less sensitive is the result to rapid position variations: in fact, adopting this approach, the speed measurement error is at most equal to the Position Error/TimeUpdateFC ratio. Nevertheless, the greater the minimum time TimeUpdateFC, the longer the inertial system remains without updating and inertia errors therefore arise during TimeUpdateFC.

The greater the factor CoefAdaptation, the less confidence may be placed in the position measurement, thus: the filter is more robust in the face of position errors, but the radius of protection associated with the speed is greater.

There now follows a discussion of the speed covariance.

Notation:

P is the covariance matrix of the filter VIKF

H is the observation matrix for the biased position measurement X

K is the gain of the Kalman filter

R is the position measurement noise n is the number of states of the filter

X1 is the position state X at which the updating takes place, X2 the speed state X, Xi the ith state, Xn=Xb the Nth state equal to the updating bias X.

VarXi is the variance associated with the state i

VarXiXj is the covariance between the states i and j

There follows the description of the updating phase, represented by the index rec.

H=[1 0 . . . 0 1]

At the time of updating:

$K = P^P \cdot H^T \cdot \text{inv}(H P^P H^T + R)$

The index T representing the transposed function (to be conformed) of a matrix, and The index p representing the propagation phase $$P^P = \begin{bmatrix} \text{Var}X1 & \text{Var}X1X2 & \cdots & 0 \\ \text{Var}X1X2 & \cdots & \cdots & 0 \\ \cdots & \cdots & \cdots & 0 \\ 0 & 0 & 0 & \text{Var}Xn \end{bmatrix}$$

because Xn is decorrelated from all the other states.

Thus:

$$P^P \cdot H^T = \begin{bmatrix} \text{Var}X1 \\ \text{Var}X1X2 \\ \cdots \\ \text{Var}X1Xn-1 \\ \text{Var}Xn \end{bmatrix} \text{ and}$$

$$K = \frac{1}{\text{Var}X1 + \text{Var}Xn + R} \begin{bmatrix} \text{Var}X1 \\ \text{Var}X1X2 \\ \cdots \\ \text{Var}X1Xn-1 \\ \text{Var}Xn \end{bmatrix}$$

The updated covariance matrix of the filter VIKF can therefore be computed $P^{rec} = P^P - KHP^P$:

$HP = [\text{Var}X1 \ \text{Var}X1X2 \ \text{Var}X1X3 \ \ldots \ \text{Var}X1Xn-1 \text{Var}Xn]$ Thus $$P^{rec} = \begin{bmatrix} \text{Var}X1 & \text{Var}X1X2 & \cdots & 0 \\ \text{Var}X1X2 & \cdots & \cdots & 0 \\ \cdots & \cdots & \cdots & 0 \\ 0 & 0 & 0 & \text{Var}Xn \end{bmatrix} - \frac{1}{\text{Var}X1 + \text{Var}Xn + R}$$

$$\begin{bmatrix} \text{Var}X1^2 & \text{Var}X1 \cdot \text{Var}X1X2 & \cdots & \cdots \\ \text{Var}X1 \cdot \text{Var}X1X2 & \text{Var}X1X2^2 & \cdots & \cdots \\ \cdots & \cdots & \cdots & \cdots \\ \cdots & \cdots & \cdots & \text{Var}Xn \end{bmatrix}$$

Therefore, considering the position covariance:

$$\text{Var}X1rec = \text{Var}X1 - \frac{1}{\text{Var}X1 + \text{Var}Xn + R} \text{Var}X1^2$$

Updating occurs when VarX1=VarXn, therefore:

$$\text{Var}X1rec = \text{Var}Xn - \frac{1}{2 \cdot \text{Var}Xn + R} \text{Var}Xn^2$$

As R<<VarXn at the time of updating:

$$\text{Var}X1rec = \text{Var}Xn - \frac{1}{2 \cdot \text{Var}Xn} \text{Var}Xn^2 = \frac{\text{Var}Xn}{2}$$

VarXn is known because the maximum uncertainty along the axis concerned is taken. To a first approximation for the simulations there has been taken the radius of protection protecting against PLFDSIS (Protection Level Fault Detection Signal In Space) satellite failures on each axis.

At the level of the speed:

$$\text{Var}X2rec = \text{Var}X2 - \frac{1}{\text{Var}X1 + \text{Var}Xn + R} \text{Var}X1X2^2$$

At the level of the speed and position correlation:

$$\text{Var}X1X2rec = \text{Var}X1X2 - \frac{1}{\text{Var}X1 + \text{Var}Xn + R} \text{Var}X1 \cdot \text{Var}X1X2$$

The following three equations are therefore obtained:

$$\mathrm{Var}X1rec = \mathrm{Var}X1 - \frac{1}{\mathrm{Var}X1 + \mathrm{Var}Xn + R}\mathrm{Var}X1^2 \quad (1)$$

$$\mathrm{Var}X2rec = \mathrm{Var}X2 - \frac{1}{\mathrm{Var}X1 + \mathrm{Var}Xn + R}\mathrm{Var}X1X2^2 \quad (2)$$

$$\mathrm{Var}X1X2rec = \mathrm{Var}X1X2 - \frac{1}{\mathrm{Var}X1 + \mathrm{Var}Xn + R}\mathrm{Var}X1 \cdot \mathrm{Var}X1X2 \quad (3)$$

There now follows the description of propagation.

A two-state (speed, position) model is assumed for the propagation with a model noise on the speed:

$$\dot{P} = FP + PF^T + Q \quad \text{(Riccatti's equation)}$$

F representing the error propagation matrix, and
Q representing the matrix of the noises associated with the model.

Where $$F = \begin{bmatrix} 0 & 1 \\ 0 & 0 \end{bmatrix} \text{ and } Q = \begin{bmatrix} 0 & 0 \\ 0 & q \end{bmatrix},$$

q being known and representing the model noise on the speed.

$$P = \begin{bmatrix} \mathrm{Var}X1 & \mathrm{Var}X1X2 \\ \mathrm{Var}X1X2 & \mathrm{Var}X2 \end{bmatrix}$$

Which yields:

$\mathrm{Var}\dot{X}1 = 2\mathrm{Var}X1X2$ $\mathrm{Var}\dot{X}2 = q$ $\mathrm{Var}\dot{X}1X2 = \mathrm{Var}X2$ Thus:

$\mathrm{Var}X2 = \mathrm{Var}X2rec + q \cdot T \quad (4)$ $\mathrm{Var}X1X2 = \mathrm{Var}X1X2rec + \mathrm{Var}X2rec \cdot T + q \cdot T^2/2 \quad (5)$ $\mathrm{Var}X1 = \mathrm{Var}X1rec + 2\mathrm{Var}X1X2rec \cdot T + \mathrm{Var}X2rec \cdot T^2 + q \cdot T3/3 \quad (6)$ T representing the propagation time between two updatings.

There now follows the description of resolution:

q, VarX1, VarX1 rec are known and it is necessary to find VarX2, VarX2rec, VarX1X2, VarX1X2rec and T.

Five equations in five unknowns are available, equation (6) having been used to find VarX1 rec.

Let S denote the variable: CoefAdaptation*VarXn. This variable is known. Assume that R<<S, so that:

VarX1=S.

VarX1rec=S/2.

Introducing equation (4) into equation (2):

$$\mathrm{Var}X2rec = \mathrm{Var}X2rec + qT - \frac{1}{2S}\mathrm{Var}X1X2^2$$

Thus:

$\mathrm{Var}X1X2 = \sqrt{2SqT}$

Using equation (3), there is obtained:

$$\mathrm{Var}X1X2 = \sqrt{2SqT} - \frac{1}{2S}S\sqrt{2SqT} = \frac{1}{2}\sqrt{2SqT}$$

Using equation (5), there is obtained:

$$\sqrt{2SqT} = \frac{1}{2}\sqrt{2SqT} + \mathrm{Var}X2Rec \cdot T + q\frac{T^2}{2}$$

$$\mathrm{Var}X2rec = \frac{1}{2}\sqrt{2S}\sqrt{\frac{q}{T}} - \frac{1}{2}qT = \frac{1}{2}\frac{(\sqrt{2SqT} - qT^2)}{T}$$

Using equation (4), there is then obtained:

$\mathrm{Var}X2 =$ $$\frac{1}{2}\sqrt{2S}\sqrt{\frac{q}{T}} - \frac{1}{2}qT + qT = \frac{1}{2}\sqrt{2S}\sqrt{\frac{q}{T}} + \frac{1}{2}qT = \frac{1}{2}\frac{(\sqrt{2SqT} - qT^2)}{T}$$

The expressions for VarX2rec and VarX2 do not communicate a great deal because T is not known; T is computed next from equation (6):

$$S = \frac{S}{2} + \sqrt{2SqT} \cdot T + \frac{1}{2}\sqrt{2SqT} \cdot T - \frac{1}{2}qT^3 + \frac{1}{3}qT^3$$

$$\text{thus: } -\frac{1}{6}qT^3 + \frac{3}{2}\sqrt{2Sq} \cdot T^{\frac{3}{2}} - \frac{S}{2} = 0$$

We set $$X = T^{\frac{3}{2}}$$

to obtain a second order equation the roots of which are:

$$\sqrt{\frac{S}{q}}\left(9\frac{\sqrt{2}}{2} + 3\sqrt{\frac{25}{6}}\right) \text{ and } \sqrt{\frac{S}{q}}\left(9\frac{\sqrt{2}}{2} - 3\sqrt{\frac{25}{6}}\right)$$

The value of T is obtained for the lowest value, that is to say:

$$\left(\sqrt{\frac{S}{q}}\left(9\frac{\sqrt{2}}{2} - 3\sqrt{\frac{25}{6}}\right)\right)^{2/3}$$

Denoting:

$$\alpha = \left(9\frac{\sqrt{2}}{2} - 3\sqrt{\frac{25}{6}}\right)^{2/3},$$

$\alpha = 0.386$ therefore:

$$T = \alpha \cdot \left(\frac{S}{q}\right)^{\frac{1}{3}} \text{ or } q = \frac{S}{T^3}\alpha^3$$

VarX2rec is rewritten as a function of S and T:

$$\operatorname{Var}X2rec = \frac{1}{2}\sqrt{2S}\sqrt{\frac{q}{T} - \frac{1}{2}qT} = \qquad (7)$$

$$\frac{1}{2}\sqrt{2S}\,\alpha^{\frac{3}{2}}\sqrt{\frac{S}{T^4} - \frac{1}{2}\frac{S}{T^2}\alpha^3} = \frac{S}{T^2}\left(\frac{\sqrt{2}}{2}\alpha^{\frac{3}{2}} - \frac{1}{2}\alpha^3\right)$$

$$\operatorname{Var}X2 = \frac{S}{T^2}\left(\frac{\sqrt{2}}{2}\alpha^{\frac{3}{2}} - \frac{1}{2}\alpha^3\right) \qquad (8)$$

Denoting $$\beta = \left(\frac{\sqrt{2}}{2}\alpha^{\frac{3}{2}} - \frac{1}{2}\alpha^3\right),$$

$\beta$ being approximately equal to 0.1410 and the square root of $\beta$ has the approximate value 0.3755.

Denoting:

$$\gamma = \left(\frac{\sqrt{2}}{2}\alpha^{\frac{3}{2}} + \frac{1}{2}\alpha^3\right),$$

$\gamma$ is approximately equal to 0.1987 and the square root of $\gamma$ has the approximate value 0.4458.

Finally, the coefficient of correlation Corr between X1 and X2 is computed:

$$\operatorname{Var}X1X2^2 = 2SqT = 2\frac{S^2}{T^2}\alpha^3 = S. \;\text{Corr.}\; \frac{S}{T^2}\left(\frac{\sqrt{2}}{2}\alpha^{\frac{3}{2}} + \frac{1}{2}\alpha^3\right)$$

There are therefore obtained:

$$\operatorname{Corr} = \frac{2\alpha^3}{\left(\frac{\sqrt{2}}{2}\alpha^{\frac{3}{2}} + \frac{1}{2}\alpha^3\right)}, \text{ and}$$

$$\operatorname{Corr\_rec} = \frac{\alpha^3}{\left(\frac{\sqrt{2}}{2}\alpha^{\frac{3}{2}} - \frac{1}{2}\alpha^3\right)}$$

Corr is approximately equal to 0.58
Corr_rec is approximately equal to 0.409
Finally, VarX2 and VarX2rec are determined from S and q, which are the main inputs:

$$\operatorname{Var}X2rec = \frac{\beta}{\alpha^2}S^{\frac{1}{3}}q^{\frac{2}{3}}:(9),\; \frac{\beta}{\alpha^2}$$

is approximately equal to 0.94

$$\operatorname{Var}X2 = \frac{\gamma}{\alpha^2}S^{\frac{1}{3}}q^{\frac{2}{3}}:(10),\; \frac{\gamma}{\alpha^2}$$

is approximately equal to 1.33

Summarizing:

$$\operatorname{Var}X1 = S \qquad (1f)$$

$$\operatorname{Var}X1rec = \frac{S}{2} \qquad (2f)$$

$$\operatorname{Var}X2 = \gamma\frac{S}{T^2} \text{ with } \gamma \text{ approximately equal to } 0.1987 \qquad (3f)$$

$$\operatorname{Var}X2rec = \beta\frac{S}{T^2} \text{ with } \beta \text{ approximately equal to } 0.1410 \qquad (4f)$$

$$\operatorname{Var}X2 = \frac{\gamma}{\alpha^2}S^{\frac{1}{3}}q^{\frac{2}{3}}(10), \qquad (5f)$$

$\frac{\gamma}{\alpha^2}$ is approximately equal to 1.33

$$\operatorname{Var}X2rec = \frac{\beta}{\alpha^2}S^{\frac{1}{3}}q^{\frac{2}{3}}(9), \qquad (6f)$$

$\frac{\beta}{\alpha^2}$ is approximately equal to 0.94

$$\operatorname{Corr} = \frac{2\alpha^3}{\left(\frac{\sqrt{2}}{2}\alpha^{\frac{3}{2}} + \frac{1}{2}\alpha^3\right)}, \qquad (7f)$$

Corr is approximately equal to 0.58

$$\operatorname{Corr\_rec} = \frac{\alpha^3}{\left(\frac{\sqrt{2}}{2}\alpha^{\frac{3}{2}} - \frac{1}{2}\alpha^3\right)}, \qquad (8f)$$

Corr_rec is approximately equal to 0.409

$$T = \alpha\cdot\left(\frac{S}{q}\right)^{\frac{1}{3}} \text{ or } q = \frac{S}{T^3}\alpha^3 \text{ with } \alpha \approx 0.386 \qquad (9f)$$

The formulas 3f and 4f show that the filter does not converge better than the uncertainty as to the safe position at the input divided by the product of the time between two updatings and a sigma coefficient equal to sqrt(0.1987) =0.4458.

Consider what happens at the level of updating the speed assuming that there is no error on the filter FC before updating and that the filter providing the measurement is corrupted by a position error equal to $\sqrt{S}$:

The reasoning applies to a filter that is not a filter with deviations:

At the level of the equations:

$$X1rec(n) = X1(n-1) + 1/2^*\left(\sqrt{S} - X1(n-1)\right)$$

$$X2rec(n) = X2(n-1) + \frac{1}{2}\sqrt{2}\,\alpha^{\frac{3}{2}}\frac{1}{T}\left(\sqrt{S} - X1(n-1)\right)$$

$$X1(n) = X1rec(n) + X2rec(n)^*T$$

$$X2(n) = X2rec(n)$$

Thus:

$$X1(n) = X1(n-1) + 1/2^*\left(\sqrt{S} - X1(n-1)\right) +$$

$$\left(X2(n-1)T + \frac{1}{2}\sqrt{2}\,\alpha^{\frac{3}{2}}\left(\sqrt{S} - X1(n-1)\right)\right)$$

-continued $$X1(n) = X1(n-1) \cdot \left(\frac{1}{2} - \frac{1}{2}\sqrt{2}\,\alpha^{\frac{3}{2}}\right) + X2(n-1)T + \sqrt{S} \cdot \left(\frac{1}{2} + \frac{1}{2}\sqrt{2}\,\alpha^{\frac{3}{2}}\right)$$

$$X2(n) = X2(n-1) + \frac{1}{2}\sqrt{2}\,\alpha^{\frac{3}{2}}\frac{1}{T}(\sqrt{S} - X1(n-1))$$

We set:

$$b = \frac{1}{2}\sqrt{2}\,\alpha^{\frac{3}{2}} = 0.1698$$

Which gives, on setting:

$$Un = \begin{bmatrix} X1(n) \\ X2(n) \end{bmatrix}:$$

$$Un = \begin{bmatrix} \frac{1}{2} - b & T \\ -\frac{b}{T} & 1 \end{bmatrix} U_{n-1} + \sqrt{S}\begin{bmatrix} \frac{1}{2} + b \\ \frac{b}{T} \end{bmatrix}$$

The maximum speed error on X2 is searched for:
The maximum is reached at the second iteration, i.e.:
The maximum error on X2 is:

$$\frac{\sqrt{S}}{T}\left(\frac{3}{2}b - b^2\right) \quad (10f)$$

with $$\left(\frac{3}{2}b - b^2\right) \approx 0.226.$$

The maximum speed error is equal to $$0.226 * \frac{\sqrt{S}}{T}$$

for a standard deviation of $$0.375 * \frac{\sqrt{S}}{T}.$$

This demonstrates that it is legitimate to use such a filter given that the covariance always bounds the error for the application part of an error on the measurement; in this case it is a constant error. Where the statistical errors of the sensors are concerned, it is necessary to multiply the standard deviation by an appropriate coefficient to obtain the probability associated with the required radius of protection.

This demonstrates that when the fault applied is constant has the value $\sqrt{S}$ then the maximum error has the value $$0.226 * \frac{\sqrt{S}}{T}$$

while the position uncertainty has the value $$0.375 * \frac{\sqrt{S}}{T}.$$

The form of error at the input that maximizes the error at the output may be questioned:
Returning to the equations:

$$Un = \begin{bmatrix} X1(n) \\ X2(n) \end{bmatrix}:$$

$$Un = \begin{bmatrix} \frac{1}{2} - b & T \\ -\frac{b}{T} & 1 \end{bmatrix} U_{n-1} + en\begin{bmatrix} \frac{1}{2} + b \\ \frac{b}{T} \end{bmatrix} = AU_{n-1} + en \cdot U$$

With the error at the input, assuming that $U_0 = 0$:

$$Un = \sum_{j=0}^{n-1} [A^j U] e_{n-1-j}$$

Assuming that the maximum amplitude of the input has the value $\sqrt{S}$, $U_n$ is therefore a maximum when $e_{n-1-j} = \sqrt{S}$ if $[A^j U](2)$ is positive and $e_{n-1-j} = -\sqrt{S}$ if $[A^j U](2)$ is negative.
The $i^{th}$ component of the vector V is denoted V(i).
It will also be shown that Un takes the form $$\alpha \frac{\sqrt{S}}{T}$$

where $\alpha$ is a constant independent of $\sqrt{S}$ and T:
The eigenvalues of A are independent of T because the polynomial giving the eigenvalues is $$\left(\frac{1}{2} - b - X\right)(1 - X) + b.$$

Remember that b is a constant.
It is also easily shown that the eigenvectors may be written in the form $$\begin{bmatrix} 1 & 1 \\ \dfrac{a}{T} & \dfrac{\overline{a}}{T} \end{bmatrix},$$

where a is a constant.

If the eigenvalues of A are denoted $\lambda 1$ and $\lambda 2$:

$$[A^jU] = \frac{1}{2ilm(a)}\begin{bmatrix} -\lambda 1^j\bar{a}+\lambda 2^ja & (\lambda 1^j-\lambda 2^j)T \\ a\bar{a}(\lambda 2^j-\lambda 1^j)\frac{1}{T} & \lambda 1^ja-\lambda 2^j\bar{a} \end{bmatrix}\begin{bmatrix} \frac{1}{2}+b \\ \frac{b}{T} \end{bmatrix}$$

Im(a) corresponds to the imaginary part of a.
It is therefore seen that $[A^jU](2)$ is in the form $$\frac{\beta j}{T},$$

which shows that Un takes the form $$\alpha\frac{\sqrt{S}}{T}.$$

The value of $\alpha$: 0.48 is computed empirically.
A maximum error of $$0.48 * \frac{\sqrt{S}}{T}$$

is therefore obtained for a standard deviation of $$0.375 * \frac{\sqrt{S}}{T}.$$

As five times the standard deviation is taken to supply a safe radius (to cover rare and normal errors), the requirement is generously covered.

One application of the present invention is to inertial navigation in civil aviation. One example might be the computation of the speed radius.

To anticipate the value of the speed covariance, it must be possible to determine the value of S and the value of Q.

Considering that the PLFDSIS is distributed across the two axes, the value of S is: $(PLFDSIS/sqrt(2))^2$. This value is varied between $50^2/2$ m$^2$ and $277^2/2$ m$^2$.

Where the value of Q is concerned, the major part of the decorrelation applied to the speed is linked to the error $\Psi$ the value of which is the sum of the angle position error and the attitude error.

This error $\Psi$ is in large part linked to the attitude error and its value is between 50 μrad and 100 μrad (for sensors used in aeronautical navigation):

$Vn+1=Vn+g\cdot\Psi\cdot T$ (ignoring the other error terms)

Whence:

$Cov(Vn+1)=Cov(Vn)+Cov(g\cdot\Psi\cdot T)+2\cdot corr\cdot sqrt(Cov(Vn)\cdot Cov(g\cdot\Psi\cdot T))$ Cov(X) representing the covariance associated with the state X.

We have: $Pvit=Pvit+g^2*Cov(\Psi)*T^2$ ignoring the last term.

Pvit representing Cov(Vn)

The orders of magnitude are as follows:

$T=100s$, $Cov(\Psi)=10^{-8}$ rad$^2$, $g=10$ m/s$^2$, sqrt(Cov(Vn))=0.02 m/s,

Corr=1=>

$g^2\times Cov(\Psi)\times T^2$=0.01 (m/s)$^2$ $2\cdot corr\cdot sqrt(Cov(Vn)\cdot Cov(g\cdot\Psi\cdot T))$=0.004 (m/s)$^2$ In contrast to the model used previously, it is seen that it is not a question of simple addition of model noise. To revert to the situation studied previously, an equivalent Q is constructed, equal to:

$Q=g^2*Cov(\Psi)*T$.

It is therefore possible to compute T from equation 9f:

$$T = \alpha\cdot\left(\frac{S}{g^2*Cov(\psi)*T}\right)^{\frac{1}{3}} \text{ thus } T = \alpha^{\frac{3}{4}}\cdot\left(\frac{S}{g^2*Cov(\psi)}\right)^{\frac{1}{4}}$$

The standard deviation is then computed as follows (multiplying by $\sqrt{2}$ to have a horizontal radius and multiplying by 5 to have an integrity at $10^{-7}$/h):

$$HIVL = 5\sqrt{2\cdot VarX2} = 5\sqrt{2\gamma\frac{S}{T^2}}$$

A numerical application yields:

$S=277^2/2$ m$^2$ $Cov(\Psi)=100.10^{-6}$ rad$^2$

=>

T=216 s

HIVL=2.8463 m/s $S=50^2/2$ m$^2$ $Cov(\Psi)=50.10-6$ rad$^2$

=>

T=130 s

HIVL=0.8551 m/s

There follow examples of civil aviation navigation simulation on a full simulator.

At t=4500 s, a GPS error on all the satellite axes is applied. What happens in a conventional filter and in the integrity filter of the present invention is considered.

Figure 4:
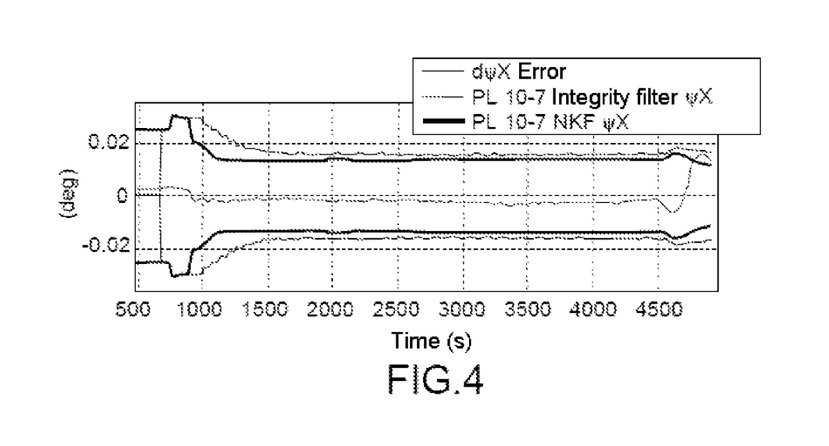
FIGS. 4 to 9 show diagrammatically measurements proving the improvements produced by a method in accordance with one aspect of the invention.
Figure 5:
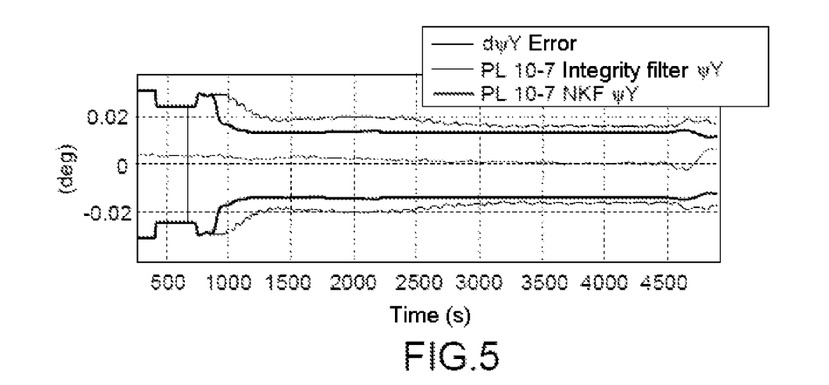
Figure 6:
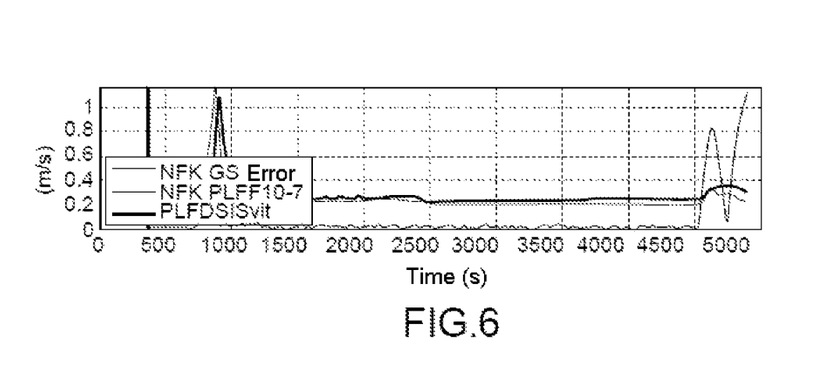

FIGS. 4, 5 and 6 show a simulation in the case of main filtering without integrity.

It is seen that the speed or attitude error exceeds the radii of protection with an integrity of $10^{-7}$/h on the attitude and on the speed.

In FIG. 4, the attitude error of the main filter NKF along the axis X exceeds the radius of integrity of the main filter (bold curve). The radius of integrity of the integrity filter is given by way of illustration to show that the values are relatively close.

Likewise in FIG. 5 for the attitude error along the axis Y.

In FIG. 6, the ground speed (GS) error of the NKF, which exceeds both the radius of integrity of protection against rare and normal errors (PLFF10-7: Protection Level Fault Free)

but also the radius of integrity of protection against undetected satellite failures (radius of protection supplied in accordance with the method shown in FIG. 1: PLFDSIS (Protection Level Fault Detection Signal In Space)).

Figure 7:
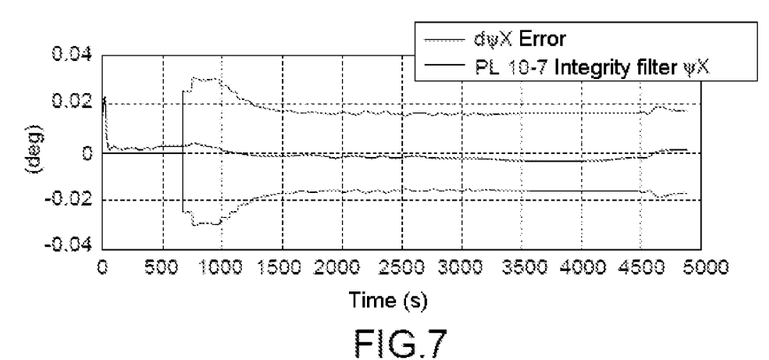
Figure 8:
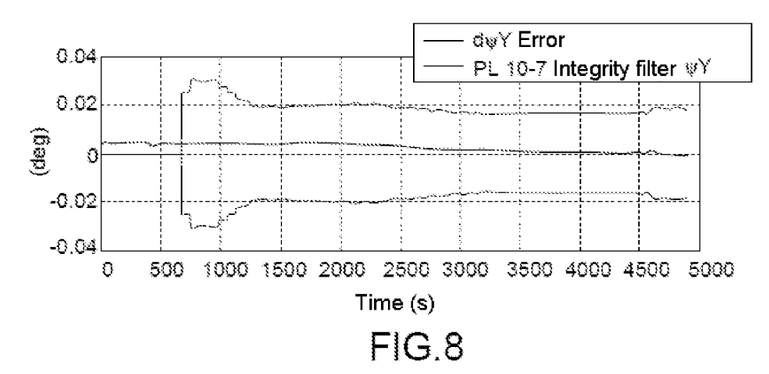
Figure 9:
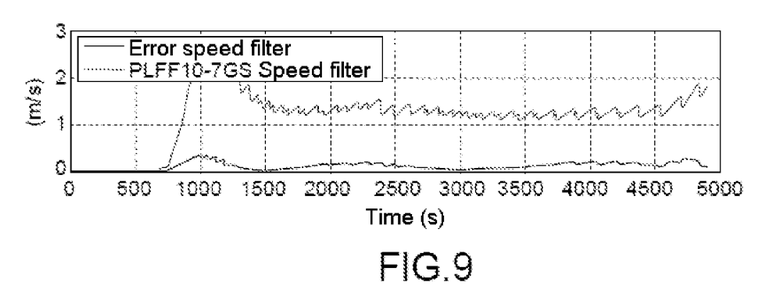

FIGS. 7, 8 and 9 show a simulation in the case of a method in accordance with the invention using the integrity filter.

It is seen that the speed or attitude error does not exceed the radii of protection of $10^{-7}$ on the attitude and on the speed. Moreover, the errors of the integrity filter are smoothed.

Of the possible applications, there may be cited by way of example the supply to the automatic pilot of an aircraft of a safe ground speed of an aircraft that is more accurate than the purely inertial speeds generally used, or the supply to a braking computer of a safe ground speed of an aircraft more accurate than the purely inertial speeds generally used.

Figure 10:
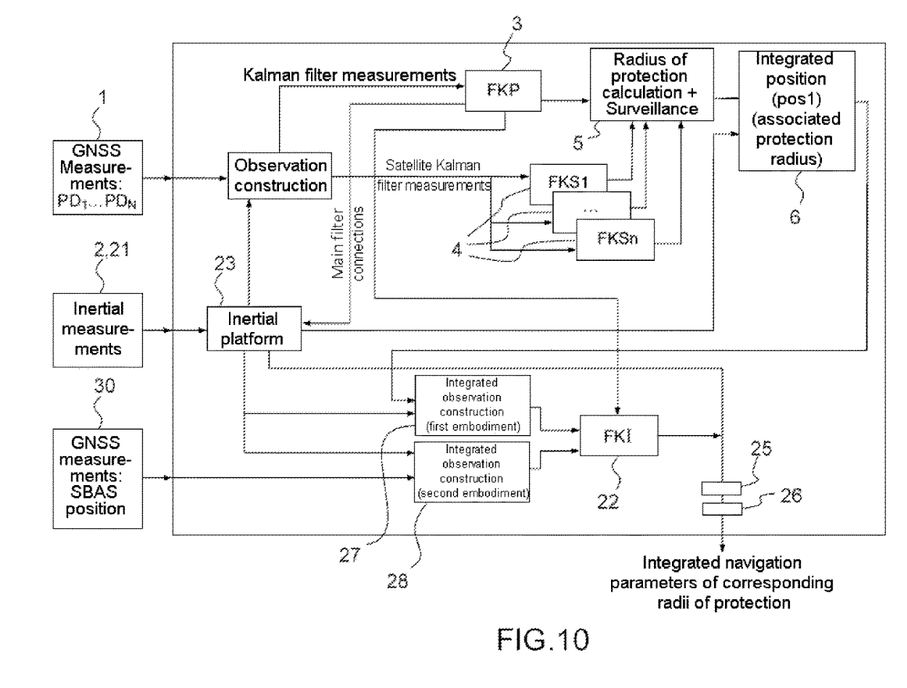
FIG. 10 shows diagrammatically one embodiment of the method in accordance with one aspect of the invention.

FIG. 10 shows one embodiment of the method in accordance with one aspect of the invention combining the method from FIG. 1, making it possible to supply safe position measurements 20, with the method of the invention from FIG. 2. In this embodiment, elements heading a reference identical to those of FIGS. 1 and 2 are similar. Two modules 27 and 28 indicate two embodiments of the invention using two different safe measurements: either a safe position measurement from the main filter NKF or an SBAS measurement from the GPS receiver.

What is claimed is:

1. A method of determining at least one radius of protection associated with a respective navigation parameter of a hybrid inertial navigation system for a vehicle using Kalman filtering, comprising: receiving at a filter input of a Kalman filter, a safe position measurement and an inertial measurement from the hybrid inertial navigation system comprising a triaxial accelerometer measurement and a triaxial rate gyro measurement; producing an inertial platform from the inertial measurements to obtain at least one navigation parameter from a set of parameters comprising position, speed, attitude and altitude of the vehicle from the hybrid inertial navigation system; performing Kalman filtering including updating of a state vector including an estimate of the errors of the navigation parameter or parameters and a covariance matrix associated with states of the state vector, propagation of the state vector, hybridizing the inertial navigation data with the safe position measurement received by means of the following iterative substeps: performing an update of the state vector based on an observation of the difference between the inertial measurement and the safe position measurement, wherein a safe position bias state is introduced into the state vector of the Kalman filter, representing an uncertainty associated with the input measured safe position measurement; decorrelating the safe position bias state of all of the other states of the state vector by means of the following substeps: rendering the safe position bias state independent of the other states during two successive propagations by increasing a model noise associated with the safe position bias state; cancelling the correlations present in the covariance matrix of the Kalman filter of the safe position bias state with all the other states; and reinitializing a diagonal element of the covariance matrix associated with the safe position bias state with the input safe position measurement uncertainty; propagating the state vector until the diagonal element of the covariance matrix associated with the position error state estimated by the Kalman filter is equal to the covariance associated with the safe position bias state; computing the safe navigation parameter or parameters of the vehicle by adding to the inertial navigation parameters from the inertial platform the estimated navigation errors contained in the state vector of the Kalman filter; and computing the radius or radii of protection associated with respective safe navigation parameter or parameters for the vehicle using the covariance matrix of the Kalman filter to thereby provide the vehicle operator with safe navigation parameters.

2. Method according to claim 1, wherein the step consisting in receiving at the input of the filter a safe position measurement uses a system combining inertia and a satellite navigation system.

3. The method of claim 1, wherein the step of receiving, at the input of the Kalman filter, a safe position measurement uses a spatial augmentation system.

4. A system for determining at least one radius of protection associated with a respective navigation parameter of a hybrid inertial navigation system of a vehicle, the system comprising: a Kalman filter configured to: receive, at the filter input, a safe position measurement and an inertial measurement from the hybrid inertial navigation system comprising a triaxial accelerometer measurement and a triaxial rate gyro measurement; produce an inertial platform from the inertial measurements to obtain at least one navigation parameter from a set of parameters comprising position, speed, attitude and altitude of the vehicle from the hybrid inertial navigation system; generate Kalman filtering including updating of a state vector including an estimate of the errors of the navigation parameter or parameters and a covariance matrix associated with states of the state vector, propagation of the state vector, hybridizing the inertial navigation data with the safe position measurement received by means of the following iterative substeps: generate an update of the state vector based on an observation of the difference between the inertial measurement and the safe position measurement, wherein a safe position bias state is introduced into the state vector of the Kalman filter, representing an uncertainty associated with the input measured safe position measurement; decorrelate the safe position bias state of all of the other states of the state vector by means of the following substeps: render the safe position bias state independent of the other states during two successive propagations by increasing a model noise associated with the safe position bias state; cancel the correlations present in the covariance matrix of the Kalman filter of the safe position bias state with all the other states; and reinitialize a diagonal element of the covariance matrix associated with the safe position bias state with the input safe position measurement uncertainty; propagating the state vector until the diagonal element of the covariance matrix associated with the position error state estimated by the Kalman filter is equal to the covariance associated with the safe position bias state; compute the safe navigation parameter or parameters of the vehicle by adding to the inertial navigation parameters from the inertial platform the estimated navigation errors contained in the state vector of the Kalman filter; and compute the radius or radii of protection associated with respective safe navigation parameter or parameters for the vehicle using the covariance matrix of the Kalman filter to thereby provide an operator of the vehicle with safe navigation parameters.

5. The system according to claim 4, wherein the Kalman filter configured to receive the safe position measurement is further configured to receive safe position measurement using a system combining inertia and a satellite navigation system.

6. The system according to claim 4, wherein the Kalman filter configured to receive the safe position measurement is further configured to receive the safe position measurement using a spatial augmentation system.

7. The system of claim 4 wherein the vehicle is an aircraft.
8. An aircraft including a system according to claim 5.
9. The system of claim 6 wherein the vehicle is an aircraft.

* * * * *